United States Patent [19]

Alexandrov et al.

[11] Patent Number: 4,588,330
[45] Date of Patent: May 13, 1986

[54] DEVICE FOR STARTING AND BRAKING CONTAINERS AND LOCKING THEM AFTER THEY ARE STOPPED

[76] Inventors: Adolf M. Alexandrov, ulitsa Chelyabinskaya, 19, korpus 4, kv. 457; Igor I. Volyansky, ulitsa Stratonavtov, 13, korpus 1, kv. 12; Jury A. Yashin, Yaroslavskoe shosse, 59, kv. 55; Vladimir Y. Tsernes, Kirovogradskaya 24, korpus 3, kv. 204, all of Moscow, U.S.S.R.

[21] Appl. No.: 584,948

[22] PCT Filed: Jun. 25, 1982

[86] PCT No.: PCT/SU82/00021

§ 371 Date: Feb. 2, 1984

§ 102(e) Date: Feb. 2, 1984

[87] PCT Pub. No.: WO84/00145

PCT Pub. Date: Jan. 19, 1984

[30] Foreign Application Priority Data

Dec. 28, 1979 [SU] U.S.S.R. ............... 2859224

[51] Int. Cl.[4] ............................................ B65G 51/20
[52] U.S. Cl. ................................................... 406/83
[58] Field of Search .................. 406/192, 83, 198

[56] References Cited

U.S. PATENT DOCUMENTS 3,762,665 10/1973 Alexandrov et al. ............... 406/83

FOREIGN PATENT DOCUMENTS 2516903 11/1975 Fed. Rep. of Germany ...... 406/198
757431 8/1980 U.S.S.R. .
919958 4/1982 U.S.S.R. .

Primary Examiner—Jeffrey V. Nase
Assistant Examiner—L. E. Williams
Attorney, Agent, or Firm—Ladas & Parry

[57] ABSTRACT

A device for starting and braking containers and locking them after they are stopped, used in pneumatic conveyors and comprising a frame (1) which successively mounts a sleeve (2) and a trough (3) adjoining a pipe-line (4) and having recesses (8, II) made at the opposite sides and serving as guides for support members of a truck (10) having a drive (12, 13, 14, 15) to move it along the guides and carrying a lever clamp (21) interacting with the container (20) and a cup (23) secured thereon and overlapping the cross-section of the pipe-line (4). An additional cup (28) overlapping the cross-section of the sleeve (2), rigidly coupled with the truck (10) and provided with support members disposed in the recesses (11) of the sleeve (2) is mounted in the sleeve (2) at the side of its butt end facing the trough (3). cross-section of a rod (29) passing through the a through hole corresponding to the cross-section of a rod (29) passing through the hole and rigidly coupled with the clamp (21) and via a locking mechanism (30) with the truck (10) is made in the central portion of the additional cup (28).

6 Claims, 4 Drawing Figures

DEVICE FOR STARTING AND BRAKING CONTAINERS AND LOCKING THEM AFTER THEY ARE STOPPED

FIELD OF THE INVENTION

The present invention relates to pneumatic conveyers and, more particularly, to devices for starting and braking containers and locking them after they are stopped.

DESCRIPTION OF THE PRIOR ART

Known in the art is a device for starting and braking containers and locking them after they are stopped, mounted in pneumatic conveyers. By the term "container" we understand "a transportation unit" which may consist both of one container or a plurality of containers forming a train.

The device comprises a frame mounting a trough which by its one end portion adjoins the pipe-line of the conveyer. The both edges of the trough have recesses made therein and serving as guides for the support members of the truck. The truck has a drive moving it along the guides and is rigidly connected with a lever clamp having a drive mounted on the truck and used to turn its levers during engagement and disengagement of the clamp with the container bumper. Rigidly secured to the clamp is a cup overlapping the cross-section of the pipe-line. The cup has support members made as wheels resting upon the inner surface of the pipe-line and the trough. (c.f. for example USSR Inventor's Certificate N 757,431 published in Bulletin "Discoveries, Inventions, Industrial Designs and Trade Marks", vol. 31, 1980).

In the known device containers are started, braked and locked after they are stopped by means of the truck moving drive which is essentially a linear electric motor whose inductor is mounted on the truck so that it can move vertically relative thereto, the secondary element being the trough made from a ferromagnetic material. Pivotly secured to the truck are levers whose some end portions are equipped with brake shoes interacting with the trough guides during the braking of the truck (for example, for stopping the container), and the other end portions of the levers are interconnected by means of brace springs and are connected with the aid of ties to the truck moving drive.

In the known device braking is provided mainly by the electric motor due to the electromagnetic forces of interaction of the inductor with the trough.

Therefore, the main forces of braking are received by the truck, which results in its rather fast wear.

Besides, in order to ensure its reliable operation, the known device requires careful maintenance during its adjustment and use, as all the elements of the lever mechanism securing the brake shoes and the linear electric motor are to be set in strictly predetermined positions and any deviations from the latter may result in skewness of the whole truck and, consequently, in inoperatability of the device. Therefore, in order to ensure operatability of the device, it is necessary to have highly skilled servicing personnel.

All this results in higher costs of the device during its use.

DISCLOSURE OF THE INVENTION

The present invention has as its task provision of such a device for starting and braking containers and locking them after they are stopped, in which the truck would be relieved of the main forces of braking and the whole device would be relatively simple in operation.

This task is accomplished by that in a device for starting and braking containers and locking them after they are stopped, for use in pneumatic conveyers, comprising a frame mounting a trough which adjoins the pipe-line of the conveyer and has its edges provided with recesses serving as guides for the truck support members, the truck having a drive moving it along the guides and carrying a lever clamp used for containers and having a cup that is secured thereon and overlaps the cross-section of the pipe-line of the conveyer, kinematically connected with the drive for its interaction with the container, according to the invention, the device is provided with a sleeve which has a diameter corresponding to that of the pipe-line of the conveyer, is positioned between the trough and the pipe-line of the conveyer and has recesses made in the inner wall thereof, disposed at the opposite side and serving as a continuation of the guides of the trough, an additional cup which overlaps the cross-section of the sleeve, is rigidly connected to the truck and carries support members positioned on the guides, and a rod passing through the additional cup, for which purpose the latter has a through hole made in the central portion thereof and corresponding to the cross-section of the rod whose one end portion is connected to the clamp and the other one is connected to the truck via a locking mechanism mounted on the latter.

This embodiment of the device makes it possible to dampen the greatest part of the kinematic energy of the moving container without transmitting it to the truck.

It is expedient to make the support members of the additional cup and the truck as slides.

This embodiment of the support members makes it possible to provide additional dampening of the kinetic energy of the moving container due to the friction between the guides and the slides.

It is possible to provide the additional cup with a lock for locking it in the case when it is disposed at the sleeve butt end facing the trough, said lock having a drive controlled by the drive of the truck.

It is expedient to mount the lock in devices used in the pneumatic conveyers in which the complete dampening of the kinetic energy of the moving container and its stoppage take place within the sleeve length limits.

It is expedient that the lock has two mutually engageable toothed segments mounted on the frame in a plane parallel to the plane of the additional cup so that they can turn, and pivotly connected to rods disposed in the plane and passing through the sleeve guides secured on the frame.

This constructive embodiment of the lock is most simple and reliable in operation.

It is no less expedient that the mechanism locking the rod with respect to the truck contains two spring-loaded levers whose axles of turning are secured to the truck, and stops interacting with the respective arms of the levers are mounted on the trough and the rod.

The design of the locking mechanism is the simplest.

It is also expedient that toothed racks are provided along the recesses of the trough and the sleeve, and the truck drive has a gear box whose gears engage the racks.

It is most advisable to employ this design of the truck drive in the device used in pneumatic conveyers in which containers move at a relatively high speed, as there takes place an additional dampening of the kinetic energy of the moving container in the teeth engagement, and the container is stopped in the trough.

The device for starting and braking containers and locking them after they are stopped, used in pneumatic conveyers, built in accordance with the present invention, makes it possible to ensure dampening of the kinetic energy of the moving container in the sleeve along a relatively short path in two stages due to provision of air cushions in the sleeve between the container and the cup and between the cups, thereby relieving the truck of the braking force. Besides, the device is simple in adjustment and operation.

The following description of a specific embodiment of the present invention is given with reference to the accompanying drawings, in which:

SUMMARY OF THE ACCOMPANYING DRAWINGS

BEST MODE OF CARRYING THE INVENTION INTO EFFECT

Figure 2:
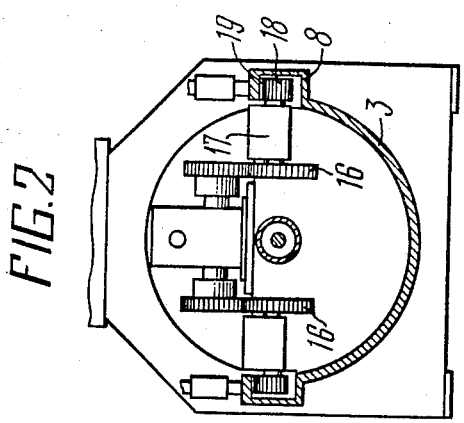
FIG. 2 is section II—II in FIG. 1, with a partial extraction.
Figure 3:
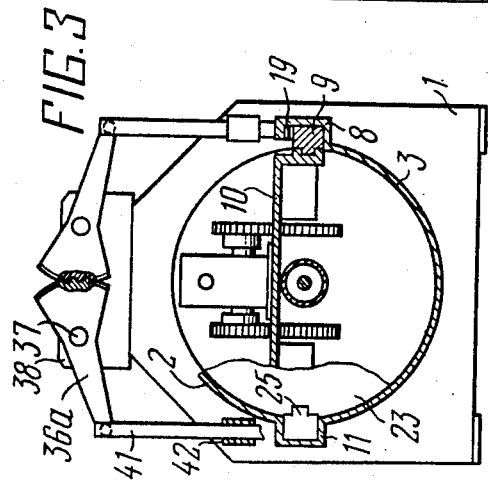
FIG. 3 is section III—III in FIG. 1.

A device for starting and braking containers and locking them after they are stopped comprises a frame 1 (FIG. 1) which has a sleeve 2 and a trough 3 mounted thereon in succession. The sleeve 2 has a grooved inner surface and its diameter corresponds to that of a pipe-line 4 of the pneumatic conveyer. By its one end portion the sleeve 2 adjoins the pipe-line 4 and by the other end portion—the trough 3, and its wall has a hole which is made therein and communicates the sleeve 2 space with a source of compressed air (not shown) via a casing 5 and a branch pipe 6 overlapped by a valve 7. The edges of the trough 3 have recesses 8 (FIG. 2) made therein and serving as guides bearing the same position 8 for the support members slides 9 (FIG. 3) of the truck 10. The inner wall of the sleeve 2 also has recesses 11 made from its opposite sides and serving as a continuation of the guides 8 of the trough 3. The truck 10 has a drive moving it in the guides 8 along the trough 3. The drive comprises an electric motor 12 (FIG. 1) mounted on the truck 10 and connected via a safety clutch 13 and a brake 14 with a gear box 15. Gears 16 of the gear box 15 are connected via safety clutches 17 (FIG. 2) with gears 18. Toothed racks 19 engaging the gears 18 are secured along the upper edge of each recess 8.

It is also possible to secure toothed racks along the upper edge of every recess of the sleeve.

To receive containers 20, use is made of a lever clamp 21 having a cup 23 secured on its body 22 and spring-loaded by means of a spring 24 relative to the latter. The cup 23 is mounted in the sleeve 2 with a preset gap "a" relative to its inner surface. This gap is kept with a sufficient degree of accuracy owing to precise machining of the inner surface of the sleeve 2 and centering of the sleeve 23 relative to the cup 2 by means of the support members—slides 25 (FIG. 3) disposed in the recesses 11 of the sleeve 2.

Figure 4:
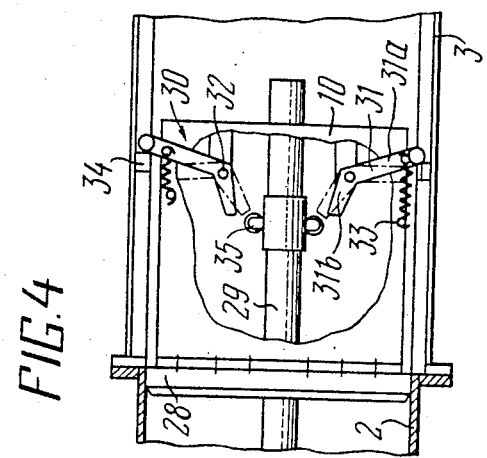
FIG. 4 is a view taken along the arrow A in FIG. 1.

Levers 27 are secured to the body 22 (FIG. 1) with the aid of axles 26. An additional cup 28 hermetically sealing the cross-section of the sleeve 2 is mounted in the sleeve 2 from the side of its butt end facing the trough 3. The additional cup 28 is rigidly connected to the truck 10 and has support members—slides (not shown) made analogous to the slides 25 of the cup 23, which are disposed in the recesses 11 of the sleeve 2 when the sleeve 2 is overlapped. A through hole used for passage of a rod 29 is made in the middle of the additional cup 28. This hole is of a shape corresponding to the cross-section of the rod 29 and seals the latter relative to the additional cup 28. The rod 29 is made hollow and is rigidly connected with its one end portion to the body 22 of the clamp 21 and with its other end portion to the truck 10 via a locking mechanism 30 (FIG. 4). The locking mechanism 30 comprises two levers 31 whose axles 32 of turning are secured symmetrically relative to the rod 29. Some arms 31a of the levers 31 are spring-loaded with springs 33 secured by some of their end portions to the truck 10 and by the other end portions to the arms 31a of the levers 31. The trough 3 and the rod 29 have stops 34 and 35 respectively secured thereon. The stops 34 interact with the arms 31a of the levers 31, and the stops 35 interact with the arms 31b.

To lock the additional cup 28 (FIG. 1) when it is disposed at the sleeve 2 butt end facing the trough 3, use is made of a lock 36 comprising two toothed segments 36a (FIG. 3) which engage with each other. The segments 36a are mounted on the frame 1 in a plane parallel to the plane of the additional cup 28 on shafts 37 of a gear box 38 (FIG. 1) connected via a clutch 39 with an electric motor 40. Each of the segments 36a is pivotly connected with a rod 41 disposed in the same plane as the segments 36a and each passes through a guide bushing 42 secured to the frame 1. The bushings 42 are arranged symmetrically relative to the longitudinal geometrical axis of the trough 3 at a distance which actually equals the inner diameter of the sleeve 2. Holes (not shown) used for passage of the rods 41 inside the trough 3 and for locking the additional cup 38 when it is disposed at the sleeve 2 butt end are made in the upper edge of the recesses 8 of the trough 3 in the area where it adjoins the sleeve 2.

The electric motor 40 is switched on by a signal from the electric motor 12. Here use can be made of any conventional control circuit suitable for the purpose.

The levers 27 of the clamp 21 used for making a turn relative to the axle 26 are kinematically coupled with a drive 43 via a rod 44 passing through the hollow rod 29. To provide for interaction of the rod 44 with the movable portion of the drive 43, the rod 44 is provided with a lug 45.

The device for starting and braking containers and locking them after they are stopped functions as follows.

In the initial position (the position of receiving) the clamp 21 connected to the rod 29 and the sealing cup 23 are disposed in the sleeve 2 and are extended into their extreme left (according to the drawing) position. The truck 10 and the cup 28 are also disposed in their extreme left (according to the drawing) position, whereby the cup 28 hermetically seals the sleeve 2, and the lock 36 locks it in this position.

Thereby, the levers 27 of the clamp 21 are brought apart by means of the rod 44 which is also extended into the extreme left position with the aid of a pusher 46 (FIG. 1) of the drive 43.

Figure 1:
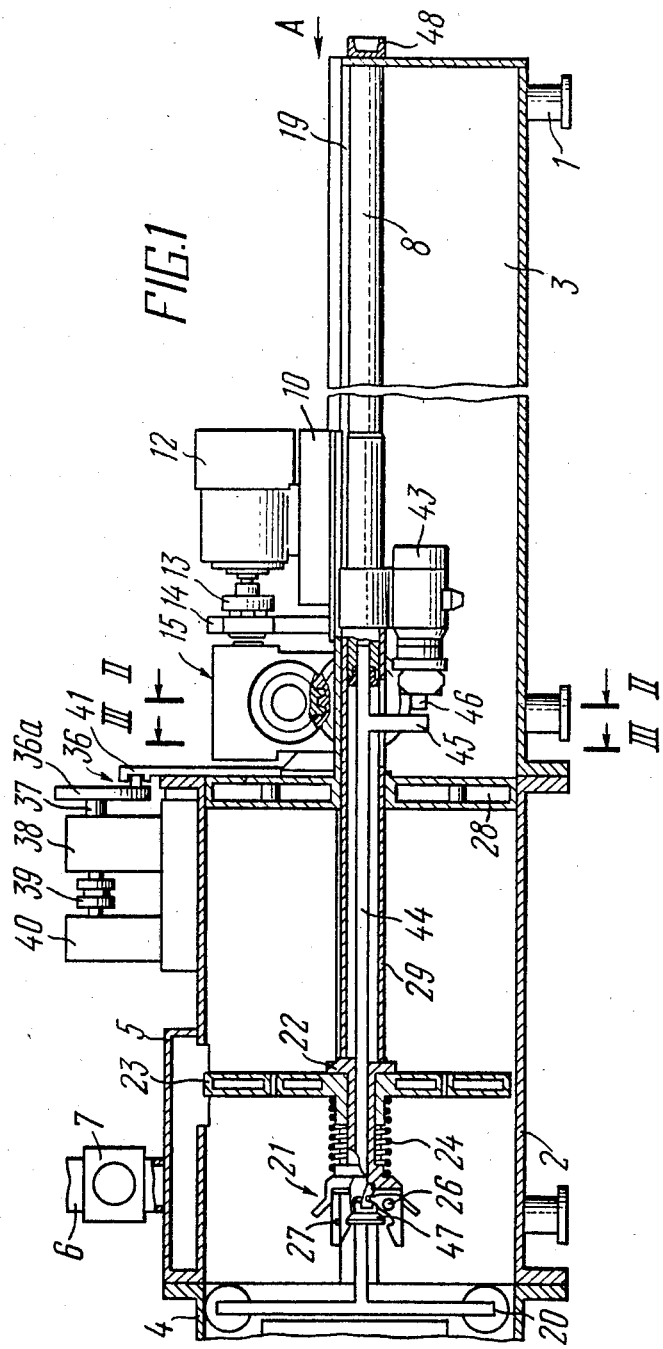
FIG. 1 shows a device for starting and braking containers and locking them after they are stopped, according to the invention, a longitudinal section.

On entering the sleeve 2 the container 20 joins the clamp 21 and, by pressing with its bumper 47 (FIG. 1)

the rod 44 locks itself. Thereupon, while compressing the spring 24, the container 20 moves under the action of inertia forces together with the clamp 21, the rod 29 and the cup 23 to the right (according to the drawing), and by compressing air in the sleeve 2 disposed between the cups 23 and 28 is braked by the air cushion provided therebetween.

Thereby, the slides 25 of the cup 23 slide along the guides 25 of the cup 23, in this way ensuring centering of the cup 23 during its displacement along the sleeve 2.

The high efficiency of the braking process is provided by a rather high quality of machining of the inner surface of the sleeve 2 and the outer surface of the sleeve 2 interacting therewith, as well as by centering the latter in the sleeve 2 with the aid of the slides 25. Thus, a preset gap "a" is provided rather accurately between the sleeve 2 and the cup 23, which, in its turn, provides rather accurately for a preset braking force. At the same time, as practice has shown, to dampen the whole kinetic energy received by the container 20 or its main part, it is sufficient to make the sleeve 2 of a length of not more than two diameters of the pipe-line 4.

It should be noted, at the same time that the device can operate according to one of the two possible variants.

Variant 1

If the container 20 is to be stopped within the limits of the sleeve 2, after the container 20 is stopped, the lock 36 is opened. Then, the electric motor 12 of the truck 10 is started, which truck 10 moves together with the cup 28 to the right (according to the drawing), and the levers 31 secured to the trough 3 turn under the action of the springs 33 and are stopped by the stops 35 secured to the rod 29, thereby fixing the rod 29 with the clamp 21 relative to the truck 10. Then, the drive continues to operate, the truck 10 together with the rod 29, the clamp 21 and the container 20 moves along the trough 3 until it thrusts against the stop 48 (FIG. 1) secured at the end thereof.

The container 20 has occupied the charging (discharging) position.

After the charging (discharging) operation is performed, the truck 10 moves with the aid of its drive the container 20 joined with the clamp 21 to the left (according to the drawing) into the starting position.

In this position the cup 28 rigidly coupled with the truck 10 stops at the butt end of the sleeve 2 hermetically overlapping its cross-section. Then, the lock 36 locking the cup 28 in this position (providing for overlapping of the sleeve 2 butte end facing the trough 3) is closed, whereby, with the truck 10 and the container 20 moving to the left into the starting position, the levers 31 "run over" the stops 34, are turned and, while being released by the stops 35, set free the rod 29 relative to the truck 10.

Then, the drive 43 of the pusher 46 is started, which pusher 46, while interacting through the lug 45 with the rod 44 and moving it to the left, brings apart the levers 27 of the clamp 21 and sets free the bumper 47 of the container 20 which can be then launched into the pipe-line 4 after compressed air is supplied along the branch pipe 6 after the valve 7 is opened.

Thus, the device has occupied the initial position.
Then, the whole cycle may be repeated.

Variant 2

Besides, the device can operate without participation in the operation of the lock 36.

Then, after the container 20 is joined with the clamp 21, a multi-stage braking takes place. Like in Variant 1 the braking is effected by the compression of air in the sleeve 2 between the cups 23 and 28 and later, after the cup 23 has "run over" the cup 28, the latter moves away from the sleeve 2 butt end into the trough 3. Thereby, the rod 29 is fixed relative to the truck 10, whereupon final braking of the received container 20 during its movement under the action of inertia forces together with the clamp 21, the rod 29, the both cups 23 and 28 and the truck 10 in the trough 3 takes place due to resistance in the gearing, the interaction of the gears 18 with the toothed racks 19, and the rated braking force developed by the brake 14 and in the clutch 13.

After the container final braking (after it has stopped in the trough 3), the drive of the truck 10 is started, and the container 20 moves into the trough 3 until it thrusts against the stop 48 to take the charging-discharging position. Thereafter, the operation is performed similarly to that described in Variant 1.

It should be noted that toothed racks serving as a continuation of the toothed racks in the trough can be additionally provided in the recesses of the sleeve, which makes it possible, if necessary, to join the clamp with the container even in the case the latter has not quite reached the end of the pipe-line.

Therefore, the device of the present invention provides for a reliable operation due to reduction of impact loads when the container is joined with the clamp by considerably decreasing the force necesssary to start the movable parts of the device because of the small sizes of the support surfaces (slides) of the parts. Complete or almost complete dampening of the kinetic energy of the container being received can be effected over a rather small length, which considerably raises the reliability of operation of the whole device and even in the case when all its other elements participating in dampening of the energy of the container being received are broken down.

Industrial Applicability

It is most expedient to use the present invention in pneumatic conveyers having the pipe-line of a relatively big diameter (a meter and more).

We claim:

1. A device for starting and braking containers and locking them after they are stopped, used in pneumatic conveyers and comprising a frame mounting a trough adjoining a pipeline and having edges with recesses used as guides of support members of the truck having a drive moving it along the guides and carrying a lever clamp for containers, provided with a cup secured thereon and overlapping the cross-section of the conveyer pipe-line kinematically connected with a drive to provide interaction with the container, the improvement comprising a sleeve (2) of a diameter corresponding to that of the conveyer pipe-line (4), disposed between the trough (3) and the conveyer pipe-line (4) and having recesses (11) made in the inner wall thereof, disposed at the opposite sides and serving as a continuation of the guides (8) of the trough (3), an additional cup (28) overlapping the cross-section of the sleeve (2), rigidly coupled with the truck (10) and carrying support members (9) disposed on the guides (11), and a rod (29)

passing through the additional cup (28) for which in the central part of the latter there is made a through hole corresponding to the cross-section of the rod (29) whose one end portion is rigidly coupled with the clamp (21) of the other end portion is rigidly coupled with the truck (10) via a locking mechanism (30) mounted thereon.

2. A device according to claim 1, wherein the support members of the additional cup (28) and the truck (10) are made as slides (9).

3. A device according to claim 1, wherein the toothed racks (19) are provided along the recesses (8, 11) of the trough (3) and the sleeve (2), and the drive of the truck (10) is provided with a toothed gear box (15) whose gears (18) engage the racks (19).

4. A device according to claim 1, wherein the additional cup (28) has a lock (36) for locking it at the sleeve (2) butt end facing the trough (3) and a drive (40) actuated by the drive (12) of the truck (10).

5. A device according to claim 4, wherein the lock (36) comprises two mutually engageable toothed segments (36a) mounted on the frame (1) in a plane parallel to the plane of the additional cup (28) and capably of turning, and pivotly connected with the rods (41) disposed in the plane and passing through the guide bushings (42) secured on the frame (1).

6. A device according to claim 1, wherein the mechanism (30) locking the rod (29) relative to the truck (10) comprises two spring-loaded levers (31) whose axles (32) of turning are secured on the truck (10), and stops (34,35) interacting with the respective arms (31a), 31b) of the levers (31) are mounted on the trough (3) and on the rod (29).

* * * * *